United States Patent
Nakayama et al.

(10) Patent No.: US 8,808,414 B2
(45) Date of Patent: Aug. 19, 2014

(54) SIALON SINTERED BODY AND CUTTING INSERT

(75) Inventors: Hiroko Nakayama, Komaki (JP); Ryoji Toyoda, Kakamigahara (JP)

(73) Assignee: NGK Spark Plug Co., Ltd., Aichi (JP)

( * ) Notice: Subject to any disclaimer, the term of this patent is extended or adjusted under 35 U.S.C. 154(b) by 322 days.

(21) Appl. No.: 13/256,189

(22) PCT Filed: Mar. 11, 2010

(86) PCT No.: PCT/JP2010/001741
§ 371 (c)(1),
(2), (4) Date: Nov. 28, 2011

(87) PCT Pub. No.: WO2010/103839
PCT Pub. Date: Sep. 16, 2010

(65) Prior Publication Data
US 2012/0066981 A1    Mar. 22, 2012

(30) Foreign Application Priority Data
Mar. 13, 2009    (JP) .................................. 2009-060805

(51) Int. Cl.
| | | |
|---|---|---|
| B24D 3/00 | (2006.01) | |
| B24D 11/00 | (2006.01) | |
| B24D 18/00 | (2006.01) | |
| C09K 3/14 | (2006.01) | |
| B24D 3/02 | (2006.01) | |
| C09C 1/68 | (2006.01) | |

(52) U.S. Cl.
USPC .................................. 51/307; 51/293; 51/308

(58) Field of Classification Search
USPC ............................................ 51/307, 308, 293
See application file for complete search history.

(56) References Cited

U.S. PATENT DOCUMENTS

| | | | |
|---|---|---|---|
| 4,818,635 A | | 4/1989 | Ekstrom et al. |
| 4,943,543 A | * | 7/1990 | Ingelstrom .................... 501/97.1 |
| 5,370,716 A | | 12/1994 | Mehrotra et al. |
| 5,965,471 A | | 10/1999 | Brandt |
| 6,187,254 B1 | * | 2/2001 | Collin et al. .................. 264/640 |
| 7,629,281 B2 | | 12/2009 | Osthols |
| 2008/0119349 A1 | | 5/2008 | Abukawa et al. |

FOREIGN PATENT DOCUMENTS

| | | |
|---|---|---|
| CN | 85 1 01384 A | 5/1987 |
| JP | 60-239365 A | 11/1985 |

(Continued)

OTHER PUBLICATIONS

Office Action issued on Jan. 14, 2013 for counterpart Chinese Application No. 201080011901.0.

*Primary Examiner* — James McDonough
(74) *Attorney, Agent, or Firm* — Sughrue Mion, PLLC

(57) ABSTRACT

The present invention provides a technique of improving wear resistance of a Sialon sintered body. The Sialon sintered body has a Sialon phase including at least a β-Sialon and a 12H-Sialon among an α-Sialon, the β-Sialon and the 12H-Sialon. A ratio of a second Sialon total content, which is a sum of the contents of the α-Sialon and the 12H-Sialon, to a first Sialon total content, which is a sum of contents of the α-Sialon, the β-Sialon and the 12H-Sialon, is greater than 20% and not greater than 55%, and a ratio of the content of the 12H-Sialon to the first Sialon total content is not less than 2% and not greater than 55%.

7 Claims, 6 Drawing Sheets

(56) References Cited

FOREIGN PATENT DOCUMENTS

| JP | 2824701 | B2 | 11/1998 |
| JP | 2006-175561 | A | 7/2006 |
| JP | 2008-162882 | A | 7/2008 |
| JP | 4191268 | B2 | 12/2008 |

* cited by examiner

Fig.2

| | STRENGTH | RESISTANCE PERFORMANCE AGAINST NOTCH WEAR | RESISTANCE PERFORMANCE AGAINST VB WEAR | CUTTING PERFORMANCE |
|---|---|---|---|---|
| β-SIALON | ◎ | △ | △ | △ |
| β-SIALON +12H-SIALON | △ | ◎ | ○ | ○ |
| β-SIALON +12H-SIALON +α-SIALON | ○ | ○ | ◎ | ◎ |
| CONTENTS OF 12H-SIALON AND α-SIALON OUT OF PREFERABLE RANGE | × | × | × | × |

Fig.3

| | COMPOSITION (mol%) | | | | | | |
|---|---|---|---|---|---|---|---|
| | Si$_3$N$_4$ | Al$_2$O$_3$ | AlN | Y$_2$O$_3$ | Dy$_2$O$_3$ | Yb$_2$O$_3$ | 21R |
| EXAMPLE 1 | 54.2 | 11.3 | 31.7 | 2.8 | – | – | – |
| EXAMPLE 2 | 44.0 | 12.5 | 40.9 | 2.6 | – | – | – |
| EXAMPLE 3 | 35.2 | 13.2 | 49.3 | 2.3 | – | – | – |
| EXAMPLE 4 | 27.8 | 13.5 | 56.6 | 2.1 | – | – | – |
| EXAMPLE 5 | 44.9 | 15.0 | 37.5 | 2.7 | – | – | – |
| EXAMPLE 6 | 54.0 | 10.8 | 32.4 | – | 2.8 | – | – |
| EXAMPLE 7 | 54.0 | 10.8 | 32.4 | – | – | 2.8 | – |
| EXAMPLE 8 | 80.8 | 1.6 | 14.1 | 3.5 | – | – | – |
| EXAMPLE 9 | 28.8 | 17.3 | 51.7 | 2.2 | – | – | – |
| COMPARATIVE EXAMPLE 1 | 66.2 | 9.2 | 21.4 | 3.2 | – | – | – |
| COMPARATIVE EXAMPLE 2 | 58.2 | 19.4 | 19.4 | 3.0 | – | – | – |
| COMPARATIVE EXAMPLE 3 | 23.0 | 13.7 | 61.3 | 2.0 | – | – | – |
| COMPARATIVE EXAMPLE 4 | 65.5 | 7.9 | 23.6 | 3.1 | – | – | – |
| COMPARATIVE EXAMPLE 5 | 48.5 | 24.3 | 24.3 | 2.9 | – | – | – |
| COMPARATIVE EXAMPLE 6 | 75.2 | 12.1 | – | 3.4 | – | – | 9.3 |
| COMPARATIVE EXAMPLE 7 | 74.3 | 13.8 | – | 3.4 | – | – | 8.5 |

Fig.4

| | FIRST CONTENT RATIO $(I_\alpha + I_{12H})/(I_\alpha + I_\beta + I_{12H})$ (%) | SECOND CONTENT RATIO $I_{12H}/(I_\alpha + I_\beta + I_{12H})$ (%) | THIRD CONTENT RATIO $I_\alpha/(I_\alpha + I_\beta + I_{12H})$ (%) | Z VALUE OF $\beta$-SIALON | CONTENT OF Y (wt%) | CUTTING DISTANCE (km) |
|---|---|---|---|---|---|---|
| EXAMPLE 1 | 21 | 7 | 14 | 1.1 | 3.9 | 0.67 |
| EXAMPLE 2 | 26 | 19 | 7 | 1.2 | 3.9 | 0.76 |
| EXAMPLE 3 | 30 | 28 | 2 | 1.1 | 4.0 | 0.72 |
| EXAMPLE 4 | 46 | 46 | 0 | 1.3 | 4.0 | 0.63 |
| EXAMPLE 5 | 22 | 22 | 0 | 1.2 | 3.9 | 0.58 |
| EXAMPLE 6 | 37 | 5 | 32 | 1.2 | 0.0 | 0.48 |
| EXAMPLE 7 | 46 | 9 | 37 | 1.1 | 0.0 | 0.50 |
| EXAMPLE 8 | 22 | 6 | 16 | 0.5 | 4.1 | 0.51 |
| EXAMPLE 9 | 21 | 3 | 18 | 1.7 | 4.0 | 0.50 |
| COMPARATIVE EXAMPLE 1 | 16 | 0 | 16 | 1.0 | 3.9 | 0.28 |
| COMPARATIVE EXAMPLE 2 | 0 | 0 | 0 | 1.5 | 4.1 | 0.36 |
| COMPARATIVE EXAMPLE 3 | 58 | 58 | 0 | 1.3 | 3.9 | BREAKAGE |
| COMPARATIVE EXAMPLE 4 | 34 | 0 | 34 | 1.3 | 4.0 | BREAKAGE |
| COMPARATIVE EXAMPLE 5 | 0 | 0 | 0 | 1.9 | 4.0 | 0.41 |
| COMPARATIVE EXAMPLE 6 | 15 | 15 | 0 | 1.3 | 3.9 | 0.42 |
| COMPARATIVE EXAMPLE 7 | 5 | 5 | 0 | 1.3 | 3.9 | 0.38 |

SIALON SINTERED BODY AND CUTTING INSERT

CROSS REFERENCE TO RELATED APPLICATIONS

This application is a National Stage of International Application No. PCT/JP2010/001741 filed Mar. 11, 2010 claiming priority based on Japanese Patent Application No. 2009-060805 filed Mar. 13, 2009, the contents of all of which are incorporated herein by reference in their entirety.

TECHNICAL FIELD

The present invention relates to a Sialon sintered body.

BACKGROUND ART

Tools equipped with cutting inserts are commonly known as cutting tools used for cutting work of heat-resistant alloys. The "cutting insert" generally means a disposable cutting edge detachably attached to one end of the main body of a cutting tool, and is a tool component called a throw-away chip or a replaceable chip (see, for example, Patent Literature 1).

For the improved wear resistance, the cutting insert is generally made of a Sialon ceramic material (Sialon sintered body) or an alumina ceramic material reinforced with SiC whiskers (SiC whisker-reinforced alumina material). As is known in the art, the wear resistance includes resistance against notch wear and resistance against VB wear. The "resistance against notch wear" means a characteristic relating to physical wear-induced deterioration. The "resistance against VB wear" means a characteristic relating to chemical wear-induced deterioration ("flank wear").

The cutting insert made of the Sialon sintered body generally tends to have the better resistance against notch wear but the worse resistance against VB wear of the wear resistance, compared with the cutting insert made of SiC whisker-reinforced alumina material. For the better wear resistance of the cutting insert made of the Sialon sintered body, it is required to improve the resistance against VB wear of the Sialon sintered body, while preventing deterioration of the resistance against notch wear of the Sialon sintered body. This requirement is not restricted to the cutting insert but is commonly found for various working tools made of the Sialon sintered body.

Citation List

Patent Literature

Patent Literature 1: JP 2824701
Patent Literature 2: JP 4191268
Patent Literature 3: JP 2008-162882 A
Patent Literature 4: JP 2006-175561 A

SUMMARY OF INVENTION

Technical Problem

There is a requirement for providing a technique of improving the wear resistance of a Sialon sintered body.

Solution to Problem

In order to address at least part of the requirement described above, the present invention provides various aspects and embodiments described below.

One aspect of the present invention is directed to a Sialon sintered body having a Sialon phase comprising at least a β-Sialon and a 12H-Sialon among an α-Sialon, the β-Sialon and the 12H-Sialon, wherein a ratio of a second Sialon total content to a first Sialon total content is greater than 20% and not greater than 55%, and a ratio of the content of the 12H-Sialon to the first Sialon total content is not less than 2% and not greater than 55%, wherein the first Sialon total content is a sum of contents of the α-Sialon, the β-Sialon and the 12H-Sialon and the second Sialon total content is a sum of the contents of the α-Sialon and the 12H-Sialon.

The Sialon sintered body of this aspect contains the β-Sialon, so as to improve the resistance against notch wear. The Sialon sintered body also contains the 12H-Sialon and the α-Sialon having the content ratios adjusted to the preferable ranges, so as to improve the resistance against VB wear, simultaneously with preventing deterioration of the resistance against notch wear. This arrangement accordingly gives the Sialon sintered body having the improved wear resistance.

In one preferable embodiment of the Sialon sintered body, the ratio of the second Sialon total content to the first Sialon total content is greater than 20% and not greater than 50%, and the ratio of the content of the 12H-Sialon to the first Sialon total content is not less than 2% and not greater than 50%.

The Sialon sintered body of this embodiment further prevents deterioration of the resistance against notch wear, which may be caused by an excessive content ratio of the 12H-Sialon or the α-Sialon in the Sialon phase.

In one preferable embodiment of the Sialon sintered body, the ratio of the second Sialon total content to the first Sialon total content is not less than 21% and not greater than 46%, and the ratio of the content of the 12H-Sialon to the first Sialon total content is not less than 3% and not greater than 46%.

The Sialon sintered body of this embodiment has the adequately adjusted contents of the 12H-Sialon and the α-Sialon in the Sialon phase, thus further improving the wear resistance.

In one preferable embodiment of the Sialon sintered body, the ratio of the content of the α-Sialon to the first Sialon total content is greater than 0% and not greater than 15%, and the ratio of the content of the 12H-Sialon to the first Sialon total content is not less than 5% and not greater than 30%.

The Sialon sintered body of this aspect contains the α-Sialon, the 12H-Sialon and the β-Sialon in the Sialon phase, wherein the content of the α-Sialon and the content of the 12H-Sialon are adequately adjusted. This arrangement improves the strength of the Sialon sintered body, while improving the wear resistance of the Sialon sintered body.

In one preferable embodiment of the Sialon sintered body, the β-Sialon represented by a formula $Si_{6-Z}Al_ZO_ZN_{8-Z}$ has a Z value of greater than 0.7 and smaller than 1.5.

The Sialon sintered body of this aspect prevents deterioration of the wear resistance of the β-Sialon, while preventing a decrease in toughness and deterioration of the thermal shock resistance of the β-Sialon.

In one preferable embodiment of the Sialon sintered body, yttrium is contained either in particles of the α-Sialon or in an interparticle phase present between particles of the respective Sialons included in the Sialon phase.

In the Sialon sintered body of this aspect, yttrium present in the interparticle phase produces a high-melting-point glass phase, or yttrium present in the particles of the α-Sialon improves the heat resistance of the α-Sialon. This arrangement accordingly improves the wear resistance of the Sialon sintered body in a high temperature range.

One aspect of the present invention is directed to a cutting insert, comprising the Sialon sintered body described above.

The cutting insert of this aspect has the higher strength and the better wear resistance, thereby ensuring the improved cutting performance.

The principle of the present invention may be actualized by diversity of applications, for example, the Sialon sintered body and the cutting insert made of the Sialon sintered body discussed above, and a cutting machine equipped with the cutting insert.

BRIEF DESCRIPTION OF DRAWINGS

FIG. 2 is a table showing the evaluation results of wear resistance of Sialon sintered bodies prepared by various combinations of β-Sialon, 12H-Sialon and α-Sialon;

FIG. 3 is a table showing the composition ratios of material powders in respective Examples and Comparative Examples;

FIG. 4 is a table showing the measured composition of the Sialon sintered bodies and the measured cutting distances of the Sialon sintered bodies in respective Examples and Comparative Examples;

DESCRIPTION OF EMBODIMENTS

Figure 1A:
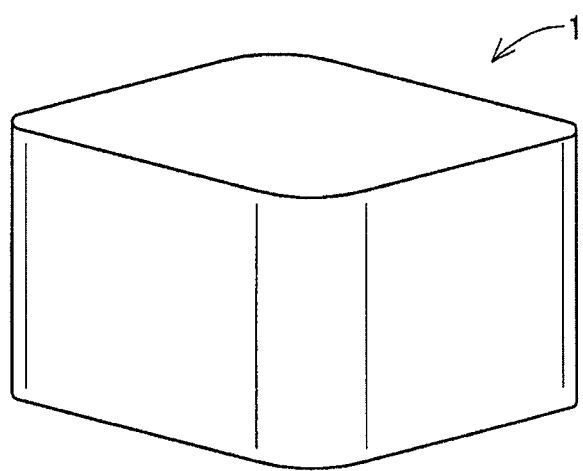
FIG. 1A is a schematic diagram showing a cutting insert.
Figure 1B:
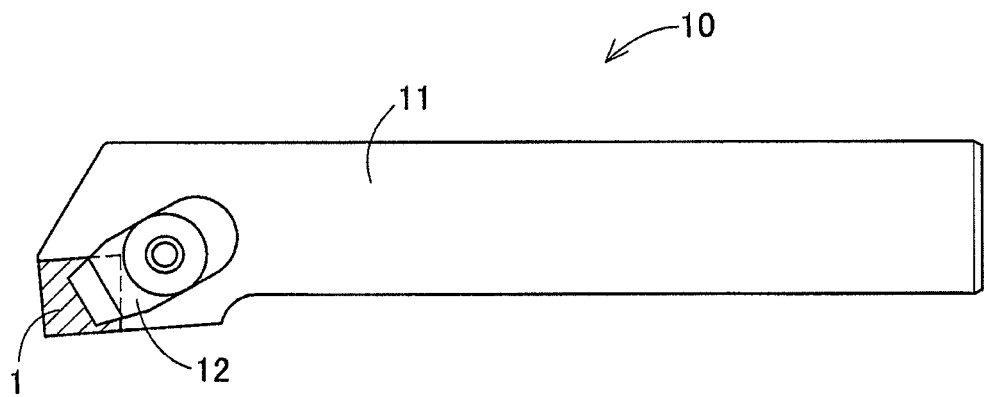
FIG. 1B is a schematic diagram showing a cutting tool equipped with the cutting insert.

FIG. 1A is a schematic diagram showing the structure of a cutting insert according to one embodiment of the invention. FIG. 1B is a schematic diagram showing the structure of a cutting tool including the cutting insert. A cutting insert 1 is a disposable cutting edge in a cuboid-like shape attachable to a cutting tool 10 used for cutting work of heat-resistant alloys. The cutting insert 1 is detachably attached to a mounting structure 12 at one end of a main body 11 of the cutting tool 10 called a holder.

The cutting insert is preferably made of a material having strength and wear resistance sufficient for the actual cuttings as the cutting tool. The "wear resistance" means a deterioration characteristics relating to friction and includes resistance against notch wear and resistance against VB wear (flank wear). The "cutting tool" means any of general tools used for rough cuttings or finish cuttings of various cutting including turning, milling and grooving. In the specification hereof, the performances of the cutting tool including the strength and the wear resistance are referred to as "cutting performance". The cutting insert 1 of this embodiment is made of a Sialon sintered body discussed below for the improved cutting performance.

The Sialon sintered body of the embodiment has a Sialon phase containing at least a β-Sialon and a 12H-Sialon among the β-Sialon, the 12H-Sialon and an α-Sialon. The characteristics and properties of these Sialons are discussed below.

(1) β-Sialon

The particles of β-Sialon are columnar (needle-like) in shape. Containing a large amount of β-Sialon in the Sialon phase of the Sialon sintered body causes the particles of β-Sialon to be complexly entangled. Such tangle prevents the growth of cracking in the Sialon sintered body occurring by, for example, an external stress. The larger content of β-Sialon in the Sialon phase results in the greater strength and the better resistance against notch wear of the Sialon sintered body.

(2) 12H-Sialon

12H-Sialon has good wear resistance at relatively high temperatures. Containing 12H-Sialon in the Sialon phase reduces the VB wear of the Sialon sintered body caused by friction heat and improves the resistance against VB wear of the Sialon sintered body. Since the particles of 12H-Sialon are plate-like in shape, 12-H Sialon has the less effect of improving the toughness of the Sialon sintered body, compared with β-Sialon. Containing a large amount of 12H-Sialon in the Sialon phase may lower the toughness of the Sialon sintered body.

(3) α-Sialon

α-Sialon has relatively high hardness. Containing α-Sialon in the Sialon phase improves the wear resistance of the Sialon sintered body. Since the particles of α-Sialon are granular in shape, an excess content of α-Sialon leads to the high possibility of lowering the toughness of the Sialon sintered body and deteriorating the resistance against notch wear of the Sialon sintered body.

The inventors of the present invention have found that combining different types of these Sialons having the characteristics and properties discussed above improves the wear resistance of the Sialon sintered body.

FIG. 2 is a table showing the evaluation results of wear resistance of Sialon sintered bodies prepared by various combinations of β-Sialon, 12H-Sialon and α-Sialon. The inventors of the present invention performed comparative evaluation of a Sialon sintered body including only β-Sialon, a Sialon sintered body including β-Sialon and 12H-Sialon, and a Sialon sintered body including all β-Sialon, 12H-Sialon and α-Sialon. Each of these different Sialon sintered bodies was evaluated for the strength, the resistance against notch wear and the resistance against VB wear. The symbols "double circle", "circle" and "triangle" in the table represent evaluation grades, which are lowered in this order.

As shown in this table, the Sialon sintered body including only β-Sialon in the Sialon phase had the highest strength. This may be ascribed to the needle-like particle morphology of β-Sialon as discussed above. The Sialon sintered body including all β-Sialon, 12H-Sialon and α-Sialon had the higher strength than the Sialon sintered body including β-Sialon and 12H-Sialon. This is ascribed to prevention of the potential growth of cracking on the Sialon sintered body by the effect of residual internal stress produced by the difference between the thermal expansion coefficient of β-Sialon and the thermal expansion coefficient of α-Sialon.

The Sialon sintered body including 12H-Sialon (and α-Sialon) in addition to β-Sialon in the Sialon phase had the better resistance against notch wear and the better resistance against VB wear than the Sialon sintered body including only β-Sialon in the Sialon phase. More specifically, the combination of β-Sialon and 12H-Sialon had slightly better resistance against notch wear than the combination of β-Sialon, 12H-Sialon and α-Sialon. The combination of β-Sialon, 12H-Sialon and α-Sialon had the highest resistance against VB wear.

According to the above evaluation results, compared with the Sialon phase containing only β-Sialon, the Sialon phase containing 12H-Sialon in addition to β-Sialon caused the Sialon sintered body applied for a cutting tool to have the improved cutting performance. Especially the Sialon phase containing α-Sialon in addition to β-Sialon and 12H-Sialon further improved the cutting performance of the Sialon sintered body.

The results of experiments described in the cited reference (JP 2008-162882) are discussed. This cited reference refers to a sintered material C containing β-Sialon and 12H-Sialon but not containing α-Sialon in the Sialon phase and a sintered material E containing α-Sialon and β-Sialon but not containing 12H-Sialon in the Sialon phase (Table 1b). This cited reference also refers to a sintered material F containing β-Sialon but containing neither 12H-Sialon nor α-Sialon (Table 1b).

This cited reference further refers to the evaluation results of cutting performance of respective cutting inserts made of the sintered materials C, E and F (Tables 4 and 5). According to the evaluation results, the cutting insert of the sintered material C containing β-Sialon and 12H-Sialon has the better cutting performance than that of the cutting insert of the sintered material F containing β-Sialon but not containing 12H-Sialon. The cutting insert of the sintered material E containing β-Sialon and α-Sialon has the better cutting performance than that of the cutting insert of the sintered material F containing β-Sialon but not containing α-Sialon. Based on these evaluation results, it is presumed that a cutting insert having good cutting performance is obtainable from the sintered material having β-Sialon, 12H-Sialon and α-Sialon in the Sialon phase.

According to the evaluation results of the experiments performed by the inventors of the present invention, however, the content ratios of 12H-Sialon and α-Sialon in the Sialon phase out of preferable ranges (the details of the preferable ranges will be explained later) result in significantly lowering the strength and deteriorating the resistance against notch wear and the resistance against VB wear. This may be ascribed to the plate-like particle shape of 12H-Sialon and the granular particle shape of α-Sialon as discussed above. In the table of FIG. 2, the significantly poorer evaluation results than the others are shown by the cross mark "x". The inventors of the present invention have found that the content ratios of 12H-Sialon and α-Sialon in the Sialon phase are preferably in the following ranges.

The sum $(I_\alpha+I_\beta+I_{12H})$ of the content $I_\alpha$ of α-Sialon, the content $I_\beta$ of β-Sialon and the content $I_{12H}$ of 12H-Sialon in the Sialon phase of the Sialon sintered body is referred to as "first Sialon total content". The sum $(I_\alpha+I_{12H})$ of the content $I_\alpha$ of α-Sialon and the content $I_{12H}$ of 12H-Sialon in the Sialon phase of the Sialon sintered body is referred to as "second Sialon total content". The ratio of the second Sialon total content $(I_\alpha+I_{12H})$ to the first Sialon total content $(I_\alpha+I_\beta+I_{12H})$ (hereafter referred to as "first content ratio") is preferably not greater than 55%. When the first content ratio $(I_\alpha+I_{12H})/(I_\alpha+I_\beta+I_{12H})$ exceeds 55%, the content of 12H-Sialon and/or the content of α-Sialon is excessive relative to the content of β-Sialon. The excessive content interferes with the toughness-increasing effect of β-Sialon and lowers the strength of the Sialon sintered body. The first content ratio $(I_\alpha+I_{12H})/(I_\alpha+I_\beta+I_{12H})$ is preferably greater than 20%. When the first content ratio $(I_\alpha+I_{12H})/(I_\alpha+I_\beta+I_{12H})$ is not greater than 20%, the content of 12H-Sialon or the content of α-Sialon is insufficient in the Sialon sintered body. The insufficient content does not ensure the sufficient wear resistance-improving effect of 12H-Sialon or α-Sialon.

The ratio of the content $I_{12H}$ of 12H-Sialon to the first Sialon total content $(I_\alpha+I_\beta+I_{12H})$ (hereafter referred to as "second content ratio") in the Sialon phase is preferably not less than 2% and not greater than 55%. When the second content ratio $I_{12H}/(I_\alpha+I_\beta+I_{12H})$ is less than 2% (especially when the second content ratio is close to 0%), the Sialon phase has the insufficient content of 12H-Sialon. The insufficient content does not enable 12H-Sialon to exert the sufficient effect of improving the resistance against VB wear of the Sialon sintered body. The insufficient content of 12H-Sialon does not sufficiently prevent a decrease in toughness of the Sialon sintered body or deterioration of the resistance against notch wear of the Sialon sintered body, which is caused by α-Sialon present in the Sialon phase. When the second content ratio $I_{12H}/(I_\alpha+I_\beta+I_{12H})$ exceeds 55%, the excessive content of 12H-Sialon in the Sialon phase significantly lowers the strength of the Sialon sintered body.

The absence of α-Sialon in the Sialon phase of the Sialon sintered body does not interfere with the effect of improving the wear resistance of the Sialon sintered body, as long as the Sialon phase of the Sialon sintered body contains β-Sialon and 12H-Sialon and the first content ratio and the second content ratio satisfy the above ranges. As explained above with reference to the table of FIG. 2, however, containing the adequately adjusted content of α-Sialon in addition to 12H-Sialon further increases the strength and improves the resistance against VB wear of the Sialon sintered body. It is accordingly more preferable to contain adequate amounts of α-Sialon and 12H-Sialon in the Sialon phase of the Sialon sintered body.

The ratio of the content $I_\alpha$ of α-Sialon to the first Sialon total content $(I_\alpha+I_\beta+I_{12H})$ in the Sialon phase is referred to as "third content ratio". The Sialon sintered body preferably has the respective Sialons, i.e., β-Sialon, 12H-Sialon and α-Sialon, in the Sialon phase such that the first content ratio is in the above range and the second content ratio and the third content ratio are respectively in the following ranges. The second content ratio is preferably not less than 5% and not greater than 30%, and the third content ratio is preferably greater than 0% and not greater than 15%. Setting the first through the third content ratios in the respective preferable ranges enables the Sialon phase of the Sialon sintered body to include adequate contents of β-Sialon, 12H-Sialon and α-Sialon, thus improving the wear resistance and increasing the strength of the Sialon sintered body.

β-Sialon is a compound represented by a composition formula $Si_{6-Z}Al_ZO_ZN_{8-Z}$ (where Z denotes a real number in a range of 0.2 to 4.2). According to a preferable embodiment of the Sialon sintered body, the value of Z in this composition formula is greater than 0.7 and smaller than 1.5. The Z value of not greater than 0.7 significantly lowers the wear resistance of β-Sialon, while the Z value of not less than 1.5 lowers the toughness and the thermal shock resistance of β-Sialon. Here the "thermal shock resistance" means durability performance against an abrupt temperature change.

According to a preferable embodiment, the Sialon sintered body has yttrium (Y) contained either in an interparticle phase or in the particles of α-Sialon. Here the "interparticle phase" means a grain boundary phase including a glass phase and a crystalline phase that is present between the particles of the respective Sialons. Yttrium generally works with silicon dioxide ($SiO_2$: called "silica") and aluminum oxide ($Al_2O_3$: called "alumina") during sintering to produce high-melting-point glass. For example, using yttrium oxide as a sintering additive generates an interparticle phase having a high-melting-point glass phase. Containing yttrium in the particles of α-Sialon improves the heat resistance of α-Sialon. The application of the yttrium-containing Sialon sintered body to a cutting tool improves the wear resistance of the cutting tool during high-speed cutting where the cutting tool is rotated at high speed and process a heat-resistant alloy in a high temperature range.

The interparticle phase preferably includes an amorphous phase or a partially amorphous-containing phase and may include a crystalline phase, such as an yttrium-aluminum-garnet (YAG) phase or a B phase. According to a preferable embodiment, the Sialon sintered body has the interparticle phase in a range of about 3% to 15%. This composition further improves the wear resistance of the Sialon sintered body at high temperatures.

A. EXAMPLES

FIG. 3 is a table showing composition ratios of respective material powders for preparing Sialon sintered bodies of various Examples and Comparative Examples according to the invention. A concrete procedure of preparation first prepared α-$Si_3N_4$ powder, $Al_2O_3$ powder, AlN powder, $Y_2O_3$ powder, $Dy_2O_3$ powder, $Yb_2O_3$ powder and AlN crystalline polymorph 21R (6AlN.$SiO_2$) powder, any of which had an average particle diameter of not greater than 1.0 μcm, according to the composition ratios shown in this table. The procedure placed the prepared material powders, ethanol and an organic binder of microcrystalline wax dissolved in ethanol in a $Si_3N_4$ pot, and wet-mixed all the ingredients with a $Si_3N_4$ ball to yield slurry. The procedure sufficiently dried the slurry and press-molded into a shape of a cutting insert in conformity with SNGN120412 of the ISO standards. The molded body was subject to degreasing with a heating apparatus in a 1-atm nitrogen atmosphere at about 600° C. for 60 minutes. The degreased molded body was placed in a $Si_3N_4$ vessel and was subject to heat treatment in a nitrogen atmosphere at the temperature of 1850° C. for 180 minutes to obtain a Sialon sintered body. The Sialon sintered body was grinded with a diamond wheel to a shape in conformity with SNGN120412 of the ISO standards. This completed the cutting insert 1 for the cutting tool (FIG. 1A).

FIG. 4 is a table showing the measured composition ratios and the evaluation results of each of the Sialon sintered bodies of Examples and Comparative Examples prepared by the preparation method discussed above. The respective contents $I_\alpha$, $I_\beta$ and $I_{12H}$ of α-Sialon, β-Sialon and 12H-Sialon in the Sialon sintered body were determined as peak heights of α-Sialon, β-Sialon and 12H-Sialon by X-ray diffraction measurement. More specifically, the respective contents $I_\alpha$, $I_\beta$ and $I_{12H}$ were obtained as:

(a) content $I_\alpha$ of α-Sialon: peak height of α-Sialon in a (201) plane at 2θ=about 30.8 degrees;

(b) content $I_\beta$ of β-Sialon: peak height of β-Sialon in a (101) plane at 2θ=about 33.4 degrees; and (c) content $I_{12H}$ of 12H-Sialon: peak height of 12H-Sialon in a (0,0,12) plane at 2θ=about 32.8 degrees.

The Z value of β-Sialon was calculated from the difference between the lattice constant of the a-axis of β-Sialon located at a depth of about 1 mm or greater from the sintered surface of the Sialon sintered body, which was measured by X-ray diffraction, and the lattice constant (7.60442 angstroms) of the a-axis of β-silicon nitride. The following Mathematical Equation (1) was used for the calculation:

$$Z=(a-7.60442 \text{ angstroms})/0.03 \tag{1}$$

where "a" in Mathematical Equation (1) represents the lattice constant of the a-axis of β-Sialon.

The reason for the measurement at the depth of about 1 mm or greater from the sintered surface is the possibility of a composition change of β-Sialon on the sintered surface. There was no significant difference between the measured value at a depth of about 0.1 mm from the sintered surface and the measured value at a depth of about 0.2 mm from the sintered surface. From these measurement results, it is presumed that stable and accurate measurement values are obtainable in any locations at the depth of about 1 mm or greater from the sintered surface. The same applies to fluorescent X-ray analysis discussed below.

The content of yttrium was measured at the depth of about 1 mm or greater from the sintered surface of the Sialon sintered body by fluorescent X-ray analysis. In the table, the content of yttrium is shown by the percent by weight (wt %) of yttrium relative to the total weight of the Sialon sintered body. The presence of yttrium either in the particles of α-Sialon or in the interparticle phase was confirmed by analyzing the mirrored cut plane on the approximate center of the Sialon sintered body at 50,000-fold magnification with an EDX analyzer attached to a scanning electron microscope.

The cutting distance is a measurement value representing the wear resistance of the cutting insert 1. The cutting distance is measured when the notch wear of the cutting insert 1 exceeds 0.5 mm or when the VB wear of the cutting insert 1 exceeds 0.2 mm during a cutting work with the cutting insert 1 under the cutting conditions given below. Both the resistance against notch wear and the resistance against VB wear of the cutting insert 1 are accordingly reflected on the measurement value of the cutting distance.

Cutting Conditions:
(a) Workpiece: Inconel 718 (45HRC)
(b) Cutting Speed: 200 m/min
(c) Feed Speed: 0.3 mm/rev
(d) Depth of Cut: 1.0 mm
(e) Geometry of Insert: SNGN120412, ISO Standards
(f) Edge Preparation: 0.05 mm
(g) Cutting Oil: Used In the table, "BREAKAGE" means that the cutting insert 1 was damaged beyond the allowable limit of the notch wear or the VB wear.

Figure 5:
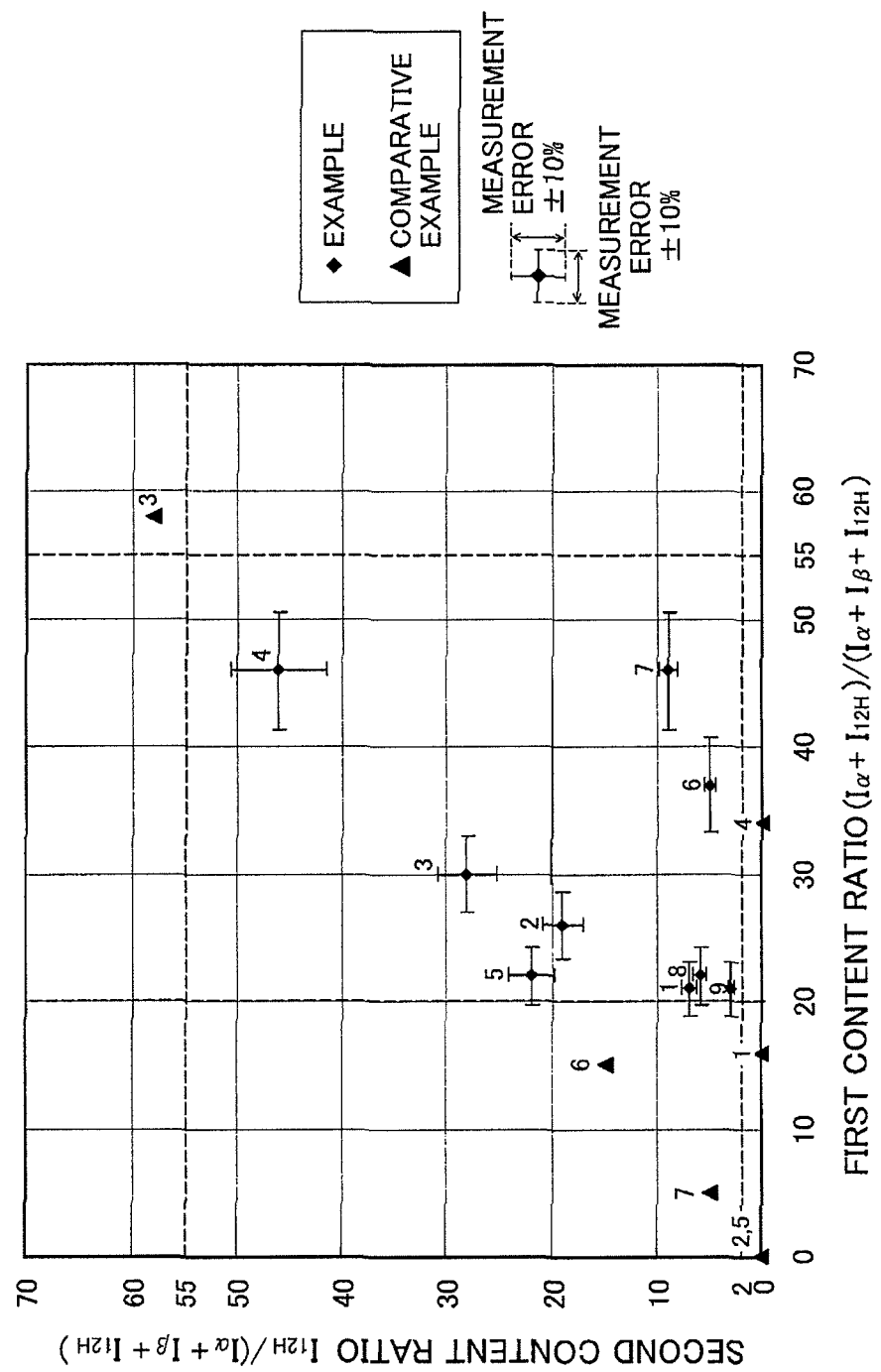
FIG. 5 is a graph showing the second content ratio plotted against the first content ratio with respect to Examples and Comparative Examples.

FIG. 5 is a graph showing the measurement results of the respective Examples and Comparative Examples shown in the table of FIG. 4, with the first content ratio of the Sialon sintered body as abscissa and the second content ratio of the Sialon sintered body as ordinate. In this graph, the plots expressed by the symbol "closed diamond" are the measurement values of the respective Examples, whereas the plots expressed by the symbol "closed triangle" are the measurement values of the respective Comparative Examples. The numerals written close to the respective plots correspond to the numbers of the respective Examples and the respective Comparative Examples shown in the table of FIG. 4. Each of the plots of the measurement values of the respective Examples has a measurement error range of "measurement value ±10%".

The graph of FIG. 5 also shows respective preferable ranges of the first content ratio $R_1$ and the second content ratio $R_2$ discussed above (20% < $R_1$ ≤ 55% and 2% ≤ $R_2$ ≤ 55%) by the broken lines. The measurement values of the respective Examples are plotted within these preferable ranges, while the measurement values of the respective Comparable Examples are out of these preferable ranges. According to this graph, the upper limit of the first content ratio $R_1$ is preferably 55% and is more preferably 50%. Similarly, the upper limit of the second content ratio $R_2$ is preferably 55% and is more preferably 50%. The first content ratio $R_1$ is preferably greater than 20%, while the second content ratio $R_2$ is not less than 2%.

On the condition that the first content ratio $R_1$ is not less than 21% and not greater than 46% and that the second content ratio $R_2$ is not less than 3% and not greater than 46%, all the Examples had the measured cutting distance of not less than 0.5 km. These ranges are thus especially preferable for the first content ratio $R_1$ and the second content ratio $R_2$. On the condition that the first content ratio $R_1$ is not less than 21% and not greater than 46% and that the second content ratio $R_2$ is not less than 7% and not greater than 46%, the Examples had the measured cutting distance of not less than 0.58 km (Examples 1 to 5). These ranges are thus more preferable.

In Examples 8 and 9, the measured Z value of β-Sialon was out of the preferable range explained previously (0.7<Z value <1.5). The measured cutting distance was 0.51 km for Example 8 and 0.50 km for Example 9, which were both significantly less than the measured cutting distance 0.67 km of Example 1 having relatively close measurement values of the first content ratio $R_1$ and the second content ratio $R_2$. This leads to the conclusion that the Z value of β-Sialon is preferably greater than 0.5 and smaller than 1.7 and more preferably greater than 0.7 and smaller than 1.5. Given the measured Z values of Examples 1 to 7 having the measurement errors of about ±10%, the Z value of β-Sialon is preferably not less than 1.0 and not greater than 1.4 and more preferably not less than 1.0 and not greater than 1.2.

The Sialon sintered bodies of Examples 6 and 7 did not contain yttrium. The measured cutting distances of Examples 6 and 7 were less than the mean cutting distance (about 0.59 km) of all the Examples. This leads to the conclusion that it is preferable to contain yttrium either in the particles of α-Sialon or in the interparticle phase of the Sialon sintered body.

The Sialon sintered bodies of Examples 1 to 3 containing α-Sialon in the Sialon phase had the better cutting performance than the Sialon sintered bodies of Examples 4 and 5 containing no α-Sialon in the Sialon phase (FIG. 4). The high evaluation of the cutting performance was not obtained for the Sialon sintered body having the small content of 12H-Sialon and no content of α-Sialon as Comparative Examples 6 and 7. The high evaluation of the cutting performance was also not obtained for the Sialon sintered body containing α-Sialon but not containing 12H-Sialon in the Sialon phase as Comparative Examples 1 and 4. These experimental results prove that it is preferable to contain β-Sialon, 12H-Sialon and α-Sialon in the Sialon phase of the Sialon sintered body.

Figure 6:
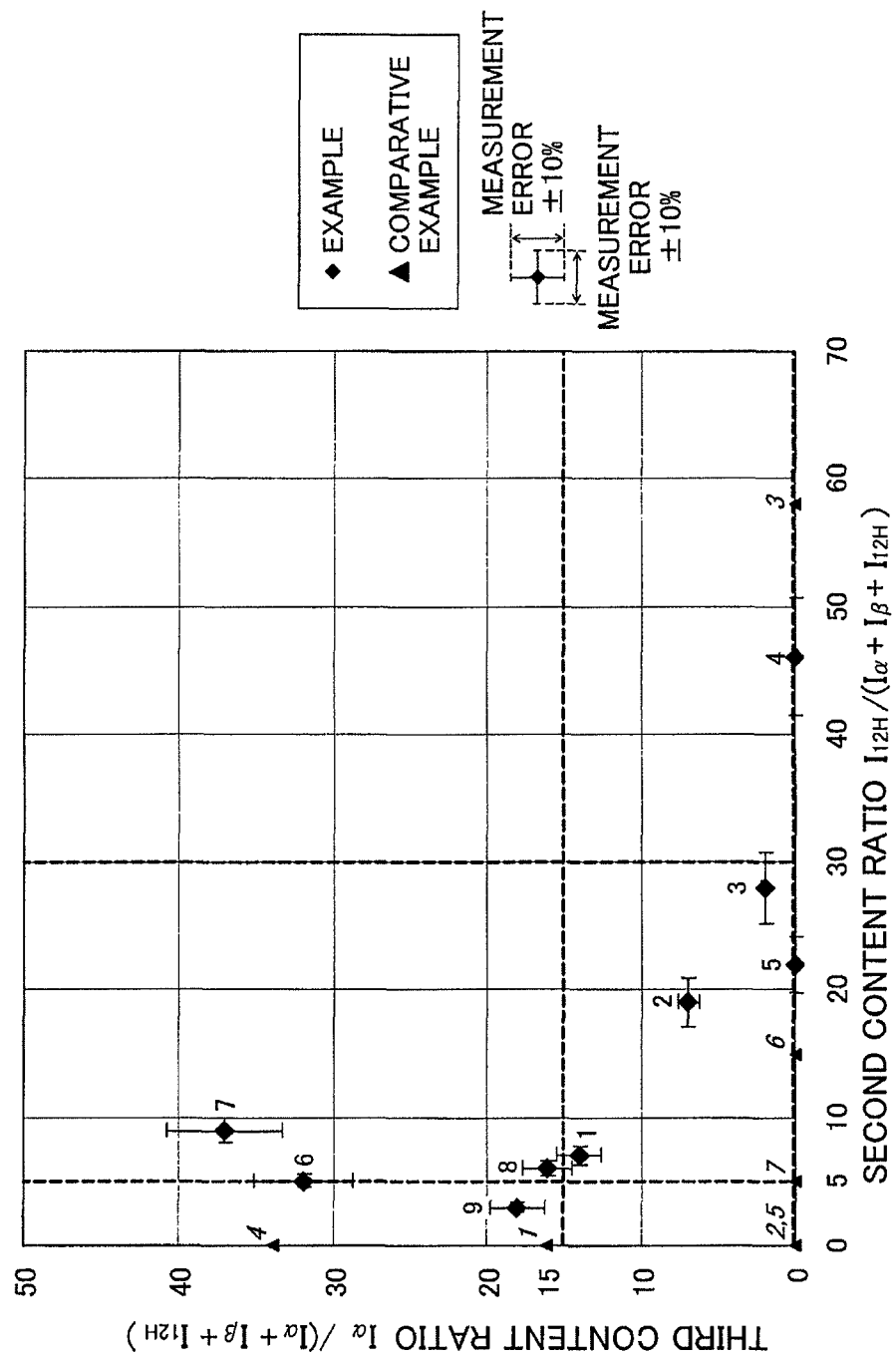
FIG. 6 is a graph showing the third content ratio plotted against the second content ratio with respect to Examples and Comparative Examples.

Like the graph of FIG. 5, FIG. 6 is a graph showing the measurement results of the respective Examples and Comparative Examples shown in the table of FIG. 4, with the second content ratio of the Sialon sintered body as abscissa and the third content ratio of the Sialon sintered body as ordinate. The graph of FIG. 6 also shows respective preferable ranges of the second content ratio $R_2$ and the third content ratio $R_3$ discussed above (5% ≤$R_2$ ≤30% and 0%<$R_3$≤15%) by the broken lines. In this graph, the measurement values of Examples 1 to 3 having the relatively high cutting performance in the table of FIG. 4 are plotted within these preferable ranges. These ranges are thus preferable for the second content ratio $R_2$ and the third content ratio $R_3$.

According to the evaluation results of FIG. 4, Example 2 has the highest cutting distance over Examples 1 and 3. This leads to the possibility that the second content ratio $R_2$ and the third content ratio $R_3$ closer to the centers of the respective preferable ranges give the better measurement result. More specifically, the second content ratio $R_2$ is especially preferable in a range of not less than 10% and not greater than 25% and more preferable in a range of not less than 15% and not greater than 20%. The third content ratio $R_3$ is especially preferable in a range of not less than 5% and not greater than 10% and more preferable in a range of not less than 6% and not greater than 8%.

As discussed above, adjusting the content ratios of β-Sialon, 12H-Sialon and α-Sialon in the Sialon phase improves the wear resistance of the cutting insert 1 made of the Sialon sintered body according to the invention. Especially, adjusting the content ratio of 12H-Sialon to the preferable range in the Sialon phase of the cutting insert 1 improves the resistance against VB wear, while preventing deterioration of the resistance against notch wear of the Sialon sintered body.

B. Modifications

The invention is not limited to any of the embodiment and Examples discussed above but may be actualized by diversity of other embodiments and Examples within the scope of the invention. Some examples of possible modification are given below.

B1. Modification 1

The above embodiment refers to the cutting insert 1 made of the Sialon sintered body. The Sialon sintered body of the invention is, however, not limited to the application of the cutting insert but may be applied to any of various other tools and product members.

B2. Modification 2

The Sialon sintered body of the embodiment may additionally contain hard particles other than the Sialon particles, e.g., titanium nitride (TiN) and titanium carbonitride (TiCN), in order to further improve the wear resistance of the Sialon sintered body. The Sialon sintered body may contain Sialon particles other than the particles of β-Sialon, 12H-Sialon and α-Sialon.

Description of Numbers

1 . . . a cutting insert
1 0 . . . a cutting tool
1 1 . . . a main body
1 2 . . . a mounting structure

The invention claimed is:

1. A Sialon sintered body having a Sialon phase comprising at least a β-Sialon and a 12H-Sialon among an α-Sialon, the β-Sialon and the 12H-Sialon,
wherein a ratio of a second Sialon total content to a first Sialon total content is greater than 20% and not greater than 55%, and a ratio of the content of the 12H-Sialon to the first Sialon total content is greater than 5% and not greater than 55%, wherein the first Sialon total content is a sum of contents of the α-Sialon, the β-Sialon and the 12H-Sialon and the second Sialon total content is a sum of the contents of the β-Sialon and the 12H-Sialon, wherein the ratio of the content of the α-Sialon to the first Sialon total content is not less than 0% and not greater than 15%.

2. The Sialon sintered body in accordance with claim 1, wherein the ratio of the second Sialon total content to the first Sialon total content is greater than 20% and not greater than 50%, and the ratio of the content of the 12H-Sialon to the first Sialon total content is greater than 5% and not greater than 50%.

3. The Sialon sintered body in accordance with claim 1, wherein the ratio of the second Sialon total content to the first Sialon total content is not less than 21% and not greater than 46%, and the ratio of the content of the 12H-Sialon to the first Sialon total content is greater than 5% and not greater than 46%.

4. The Sialon sintered body in accordance with claim 1, wherein the ratio of the content of the α-Sialon to the first Sialon total content is greater than 0% and not greater than 15%, and the ratio of the content of the 12H-Sialon to the first Sialon total content is greater than 5% and not greater than 30%.

5. The Sialon sintered body in accordance with claim 1, wherein the β-Sialon represented by a formula $Si_{6-z}Al_zO_zN_{8-z}$ has a Z value of greater than 0.7 and smaller than 1.5.

6. The Sialon sintered body in accordance with claim 1, wherein yttrium is contained either in particles of the α-Sialon or in an interparticle phase present between particles of the respective Sialons included in the Sialon phase.

7. A cutting insert, comprising the Sialon sintered body in accordance with claim 1.

* * * * *